US007835036B2

(12) United States Patent  (10) Patent No.: US 7,835,036 B2
Mestha et al.  (45) Date of Patent: Nov. 16, 2010

(54) METHOD TO AUTOMATICALLY IDENTIFY AND COMPENSATE FOR SUBSTRATE DIFFERENCES USING A SENSOR

(75) Inventors: Lalit K. Mestha, Fairport, NY (US); Raja Bala, Webster, NY (US); Reiner Eschbach, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1388 days.

(21) Appl. No.: 11/125,897

(22) Filed: May 2, 2005

(65) Prior Publication Data

US 2006/0244968 A1  Nov. 2, 2006

(51) Int. Cl.
H04N 1/40 (2006.01)
H04N 1/46 (2006.01)
G03F 3/08 (2006.01)
(52) U.S. Cl. .................. 358/3.24; 358/504; 358/505; 358/518; 358/524
(58) Field of Classification Search ............ 358/1.9, 358/3.06, 3.24, 3.26, 305, 400, 401, 406, 358/500, 501, 504, 505, 518, 524; 356/402, 356/419, 425; H04N 1/40, 1/46; G03F 3/08
See application file for complete search history.

(56) References Cited

U.S. PATENT DOCUMENTS

| 5,933,578 | A | * | 8/1999 | Van de Capelle et al. .... 358/1.9 |
| 6,192,141 | B1 | * | 2/2001 | Ahn ............................. 382/112 |
| 6,384,918 | B1 | | 5/2002 | Hubble, III et al. ......... 356/402 |
| 6,567,543 | B1 | * | 5/2003 | Shiraiwa et al. ............. 382/167 |
| 6,722,281 | B2 | * | 4/2004 | Yamamoto ................... 101/484 |
| 2002/0154325 | A1 | * | 10/2002 | Holub ......................... 358/1.9 |
| 2003/0035126 | A1 | * | 2/2003 | Stone et al. .................. 358/1.9 |
| 2003/0072043 | A1 | * | 4/2003 | Hagai et al. ................. 358/518 |
| 2004/0012817 | A1 | | 1/2004 | Brewington et al. ....... 358/3.06 |
| 2004/0125388 | A1 | * | 7/2004 | Piatt et al. .................... 358/1.9 |

OTHER PUBLICATIONS

M. Shaw, G. Sharma, R. Bala & E. Dalil, Color Printer Characterization Adjustment for Different Substrates, Color Research & Applications, vol. 28 No. 6, pp. 454-467, Dec. 2003.

* cited by examiner

Primary Examiner—James A Thompson
(74) Attorney, Agent, or Firm—Richard H. Krukar; Luis M. Ortiz; Kermit D. Lopez

(57) ABSTRACT

Identifying the substrate type of a target substrate before patterning by a marking engine produces an opportunity to adjust the marking engine. The adjustments can enable the marking engine to produce higher quality work. The target substrate's substrate type can be automatically identified by obtaining its characteristics and submitting them to a classifier. A spectrophotometer can measure a substrates reflectance spectrum, which is a good characteristic for use in classifying. Classifiers can be based on known distance or correlation measures.

19 Claims, 5 Drawing Sheets

FIG. 4

| SUBSTRATE TYPE | MARKING PARAMETER |
|---|---|
| 1 | LUT-C, LUT-M |
| 2 | LUT-K |
| 1 | LUT-Y |

FIG. 5

| SUBSTRATE TYPE | MARKING PARAMETER |
|---|---|
| 1 | $W_1$ |
| 2 | $W_2$ |
| 3 | $W_3$ |
| 1 | $W_{1A}$ |

…

METHOD TO AUTOMATICALLY IDENTIFY AND COMPENSATE FOR SUBSTRATE DIFFERENCES USING A SENSOR

TECHNICAL FIELD

Embodiments relate to the areas of printing and xerography. Embodiments also relate to automatically adjusting the marking parameters that a marking engine uses in its marking process so that it faithfully produces patterns on a substrate even when the substrate properties change.

BACKGROUND

Printers, copiers, and xerographic machines are machines that produce a pattern on a substrate. Patterns are the text and images of various colors, including black and white, and shades that can be printed on a substrate. Typically the machines consist of a means of obtaining the desired pattern and a marking engine that fixes the pattern to a substrate. Paper, cloth, and plastic are examples of substrates. A pattern can be fixed to a substrate using ink, pigments, or similar materials. Precise control is required to ensure that the pattern produced by the marking engine is acceptably similar to the desired pattern. One of the things that can cause incorrect patterning is substrate changes. A plastic substrate and a paper substrate can exhibit different patterns when subjected to the same marking process because the two substrates can accept ink differently or because the two substrates have different spectral characteristics.

Printing is a marking process in which a CMYK color space is often used in conjunction with cyan, magenta, yellow, and black inks. A pigment or other material can be used instead of ink. For simplicity, the term "ink" will be used here with the understanding that other equivalent materials can also be used to pattern a substrate. Specific colors can be achieved by dispensing precise amounts of each color of ink. For example, a mixture of half cyan ink and half magenta ink will produce a blue swatch in an ideal situation. Using more ink makes a more saturated color. However, the ideal is rarely obtained because inks are not perfect and different inks react differently with different substrates. To produce a specific blue color on a certain substrate, many different combinations of ink are tested until the right combination is found. To produce a palette of colors, many ink combinations are tested and the results stored in special tables called color tables. When a certain color is desired, the color table is consulted to find how much of each ink is required to make the color. Much of the art of color printing involves producing color tables.

Once a color table is determined, it can be used as a marking parameter. Marking parameters are used by a marking engine in the marking process in order to produce a desired pattern or color on a substrate. The problem is that most marking parameters are applicable only for certain substrates. An ink combination that produces one shade of blue on one substrate can produce a different shade of blue, or entirely a different color on a second substrate. Different color tables are therefore needed for the two substrates. The reason is that the two substrates exhibit different light reflection, color mixing and other physical properties. In general different marking parameters are required to produce the same pattern or color on different substrate types.

Typically, appropriate selection of marking parameters according to substrate requires human intervention. It takes considerable experience, expertise and skill to properly select marking parameters. Furthermore, it is possible that a change in substrate is not even noticed. In this case, the marking parameters are not appropriately updated. The results of failure to change or improperly changing marking parameters are inaccurate color output, unhappy customers, and increased costs. It is therefore advantageous to have an intelligent marking system that can automatically update the marking parameters according to the actual substrate.

One of the reasons different substrates can have different responses to the marking process is that they can have different spectral characteristics. Spectral characteristics refer to the manner in which an object responds to different wavelengths of incident light. In the case of a printable substrate, it refers to how the substrate reflects, absorbs, and scatters light at different wavelengths within the visible spectrum. A glossy white substrate and a matte textured substrate can exhibit quite different spectral characteristics. To quantify a substrate's spectral characteristics, a spectrophotometer can be used to measure its reflectance spectrum. One such device is an in-line spectrophotometer disclosed in U.S. Pat. No. 6,384,918, included by reference. Reflectance spectrums are often represented and treated as measurement vectors, such as $w = |w(\lambda_1) w(\lambda_2) \ldots w(\lambda_M)|^T$, where $w(\lambda_1)$ is the intensity of reflected light at a first wavelength, $w(\lambda_2)$ is the intensity of reflected light at a second wavelength and $w(\lambda_M)$ is the intensity of reflected light at an $M^{th}$ wavelength, and M is the number of wavelengths at which measurements are made. The superscript T indicates the matrix transpose operation.

By itself, a measurement has no meaning. It is only useful when interpreted within a meaningful context. There are many ways to interpret a measurement such as a reflectance spectrum produced by a spectrophotometer. One interpretation that is useful for the current problem of substrate identification is to classify the substrate reflectance measurement. A classifier, or classification algorithm, is an algorithm that takes target classification data corresponding to an unknown sample and assigns a category to which the unknown sample belongs. A category represents a collection of entities that share one or more common characteristics. For example, a fruit classifier could be designed to classify all fruit into the categories of apples, oranges, and bananas. When given an unknown fruit, such as a pear, the classifier would attempt to classify it among one of the known categories of apple, orange, or banana. An advanced fruit classifier might detect that the pear was in an unknown category. The reflectance spectrum of a substrate can be used as target classification data. Each category would represent a collection of substrates with substantially similar reflectance spectra.

Classifiers often use a distance calculation or correlation calculation to make a classification decision. Two common distance measures are the Euclidean distance and the Mahalinobis distance. Euclidean distance is calculated as $\sqrt{(w_1-w_2)^T(w_1-w_2)}$ where $w_1$ and $w_2$ are vectors, as discussed above. Mahalinobis distance is often calculated as $(w_1-w_2)^T A(w_1-w_2)$, where A, a weighting matrix is usually the inverse of the measurement covariance matrix. A common correlation measure is $w_1^T w_2$ although the normalized version $w_1^T w_2 / (\sqrt{w_1^T w_1} \sqrt{w_2^T w_2})$ is also used. There are many other distance measures and correlation measures known to those skilled in the arts of pattern recognition, artificial intelligence, or signal processing.

Aspects of the embodiments overcome limitations and flaws of the prior art.

BRIEF SUMMARY

Aspects of the embodiments address limitations and flaws in the prior art by identifying a substrate's substrate type and automatically adjusting the marking engine for printing on that substrate type.

It is therefore an aspect of the embodiments to determine a substrate type for a target substrate. There are many ways to determine the substrate type. One way is to simply require a human operator to input the substrate type. Another way is to compare target classification data obtained from the target substrate to substrate classification data. As discussed above, a target spectrum can be used as target classification data. The substrate classification data can be a group of representative measurements associated with substrate types and can be stored in a storage device. Representative measurements can be retrieved from the storage device and a specific representative measurement can be selected that is most similar to the target classification data. The substrate type associated with the specific representative measurement can be chosen as the substrate type of the target substrate. It should be understood that a classification of a substrate based on a set of measured values X also gives a strong correlation to a set of derivative values Y that can not directly be measured by a given measurement device. For example, spectral data might also give an indication of physical surface properties that directly influence the acceptance and transfer of colorant to the paper.

It is another aspect of the embodiment that other aspects of the paper, such as roughness, silk coating, gloss coating, etc can be derived by spectral measurement of the paper. This is done, either by measuring in one or more additional geometries, or alternatively in the case of the sensor being physically located at the marking engine output port, by measuring the spectral response of printed patterns and—using those characteristics to estimate toner layer thicknesses and thus indirectly paper surface attribute and thus identifying paper media.

It is another aspect of the embodiments to retrieve one or more marking parameters from a storage device. The storage device can hold a marking dataset. A marking dataset is a collection of marking parameters that are associated with substrate types. All of the marking parameters that are associated with a specific substrate type can be retrieved from the storage device.

It is a further aspect of the embodiments to adjust a marking engine with the marking parameters. A marking engine should be adjusted whenever a new type of substrate is presented for patterning. Otherwise, the pattern produced by the marking engine can be incorrect. Marking parameters that are associated with a substrate type can be retrieved from the storage device and passed to an adjustable marking engine. The marking engine can then be adjusted in accordance with the marking parameters to produce correct patterns on the new substrate. Some marking engines have a so-called "front end", i.e.: software means that accept many parameters and control the marking engine accordingly. Passing the marking parameters to the front end can have the effect of adjusting the marking engine.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

In accordance with an aspect of the embodiments.

In accordance with an aspect of the embodiments.

In accordance with an aspect of the embodiments.

In accordance with an aspect of the embodiments, FIG. 4 illustrates a table of marking parameters and associated substrate types.

In accordance with an aspect of the embodiments, FIG. 5 illustrates a table of representative spectrums and associated substrate types.

In accordance with an aspect of the embodiments.

DETAILED DESCRIPTION

The particular values and configurations discussed in these non-limiting examples can be varied and are cited merely to illustrate embodiments and are not intended to limit the scope of the invention.

Figure 1:
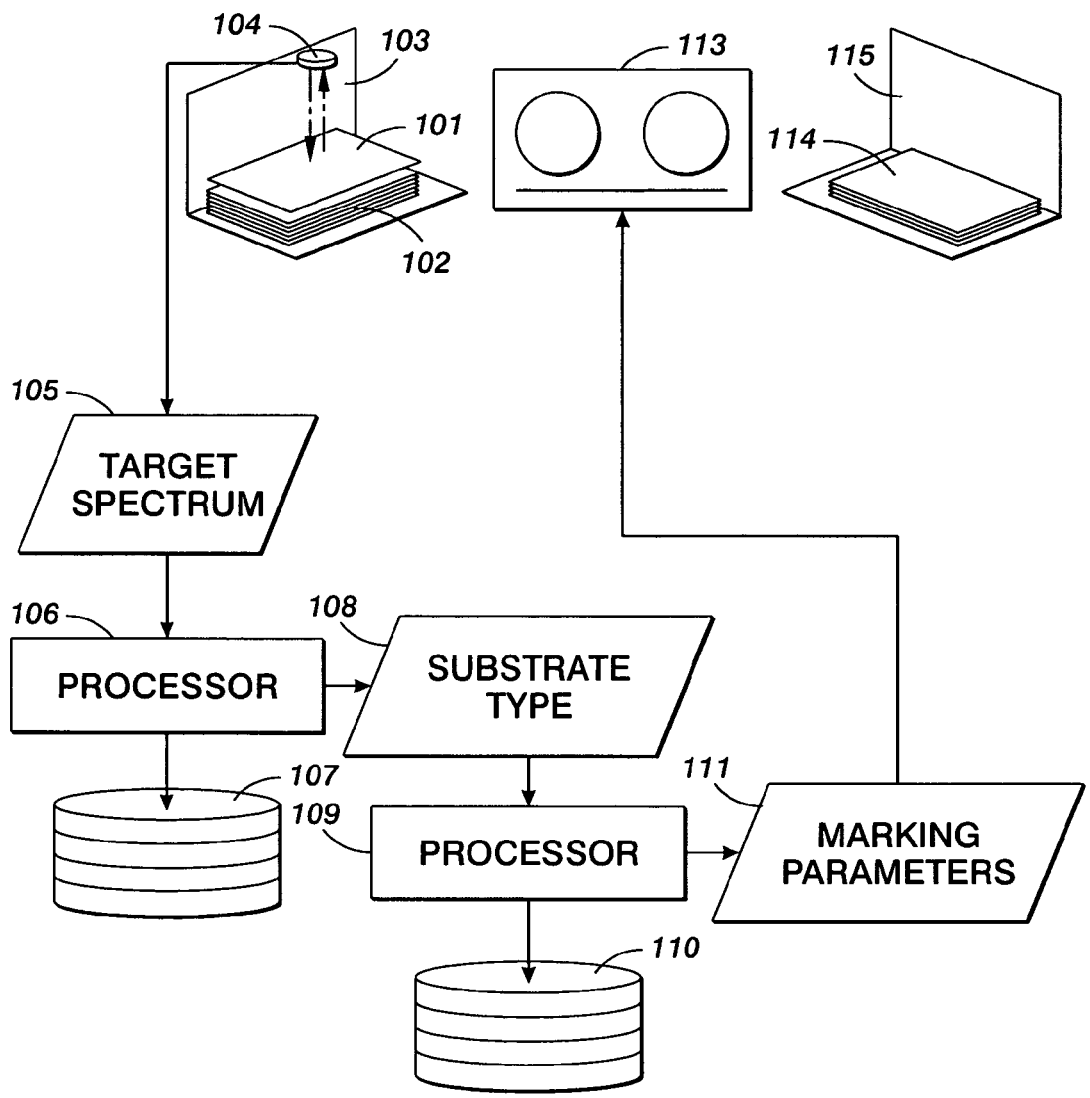
FIG. 1 illustrates an automatically adjustable marking system.

FIG. 1 illustrates an automatically adjustable marking system. A target substrate 101 can be taken from a stack 102 sitting in a marking engine's 113 input port 103. The substrate type of the target substrate 101 can be unknown. A spectrophotometer 104 can obtain a target spectrum 105 from the target substrate 101 and pass it to a processor 106. The processor 106 can retrieve representative spectra from a storage device 107 and compare them to the target spectrum 105. The comparisons can be facilitated using any of the distance or correlation measures discussed above. Based on the comparison results, the processor 106 can select a substrate type 108 for the target substrate 108.

The substrate type 108 is passed to another processor 109 that retrieves from a storage device 110 the marking parameters 111 that are associated with the substrate type 108. The marking parameters 111 are then passed to the marking engine 113. The marking engine 113 uses the marking parameters 111 to adjust for patterning the target substrate 101. After the target substrate 101 is patterned, it can be added to a stack 114 in the marking engine's output port 115.

Figure 2:
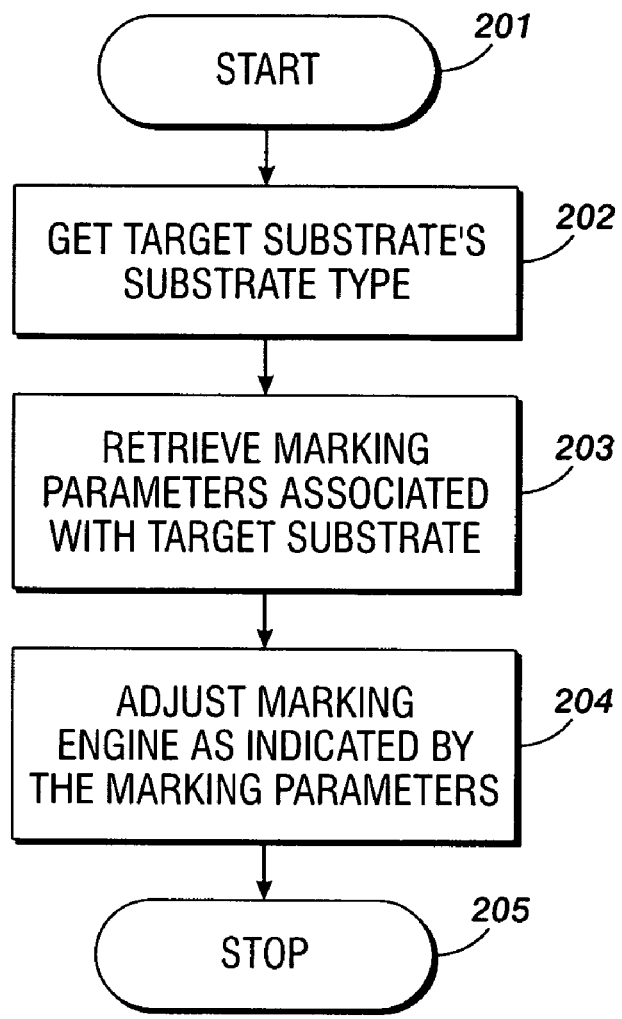
FIG. 2 illustrates a high level flow diagram for an automatically adjustable marking system.

FIG. 2 illustrates a high level flow diagram for an automatically adjustable marking system such as that shown in FIG. 1. After the start 201, the substrate type of the target substrate is determined 202. Next, the marking parameters associated with that substrate type are retrieved 203. Finally, the marking engine is adjusted as indicated by the marking parameters 204 and the process is done 205.

Marking parameters can be caused to change the marking process in a number of ways. The marking parameters can be input directly to the marking engine as control parameters. The marking parameters can be passed to a front end, which submits a job to the marking engine. A front end can adjust the job before submission, send control parameters to the marking engine, send control commands to the marking engine, or any combination of the above. The end result is that marking parameters that were retrieved from a storage device can change the marking process implemented by a marking engine. It has to be understood that in an extreme form the adjustment might be a "no print" decision if marking parameters can not be adjusted to within satisfactory levels.

Figure 3:
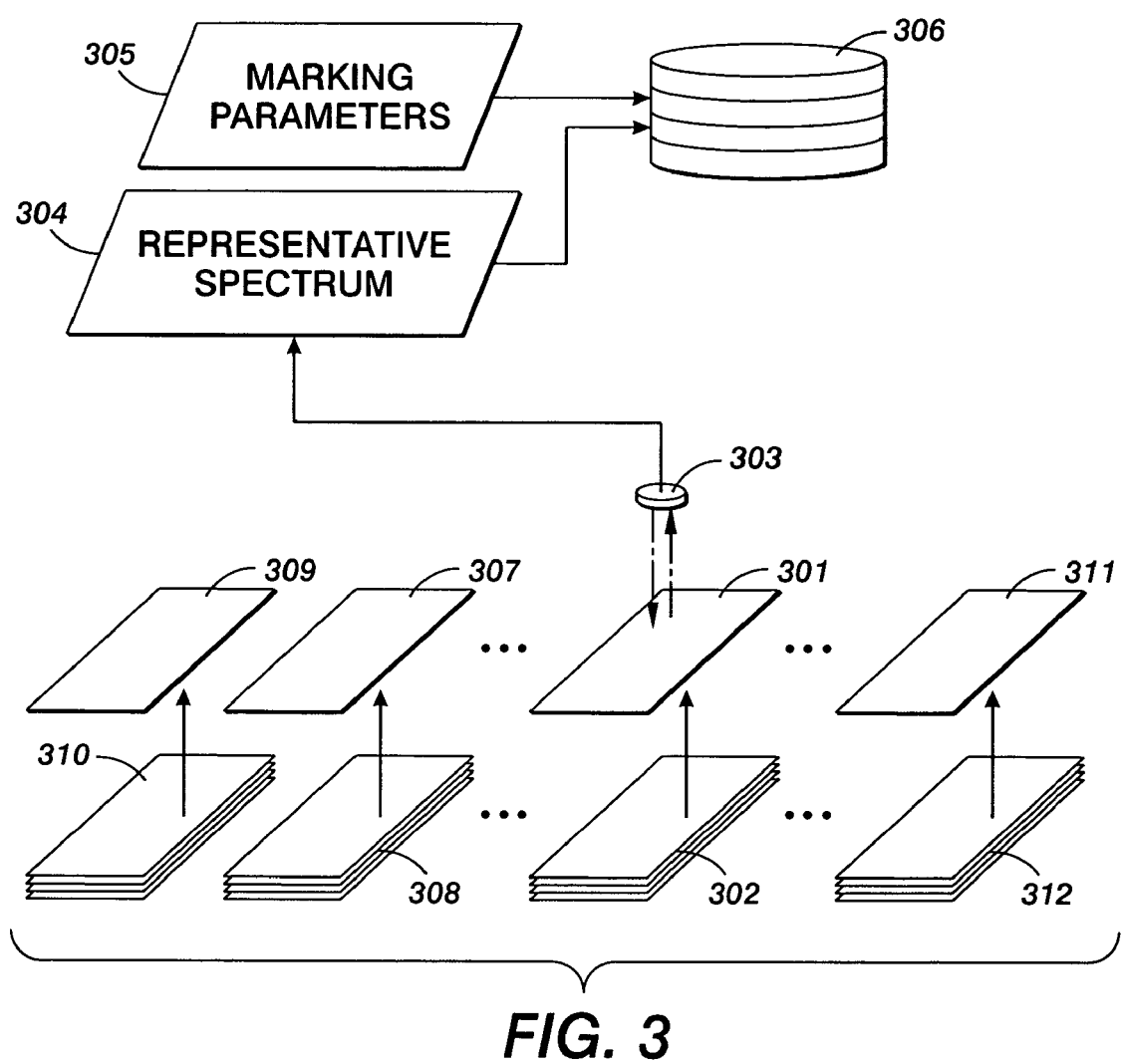
FIG. 3 illustrates production and storage of data that can be used in an automatically adjustable marking system.

FIG. 3 illustrates production and storage of data that can be used in an automatically adjustable marking system. A representative substrate 301 can be selected to represent a substrate type 302 and a spectrophotometer 303 or similar device can be used to obtain a representative spectrum 304 from the representative substrate 301. Here, the representative spectrum 304 is the reflectance spectrum of the representative substrate 301. The representative spectrum can be associated with the substrate type 302 of the representative substrate 301 because the substrate type is known. The associated representative spectrum 304 and substrate type 302 can be stored in a storage device.

Alternatively, the measured spectrum can be obtained in one or more additional geometries and the different spectra can be compared to identify derivative substrate surface characteristics, such as silk or gloss coating.

Marking parameters 305 for a substrate type 302 are either known or can be determined by testing, as discussed above, on as many representative substrates as are required for the testing. The marking parameters 305 can also be associated with the substrate type 302. The associated marking parameters 305 and substrate type can be stored in a storage device.

Data associated with many different substrate types can be stored in the storage device. FIG. 3 show a second substrate type 310, a third substrate type 308, and a fourth substrate type 312. There can be many more substrate types. Representative substrates can be taken from each of the different substrate types, as is shown for the second representative substrate 309, third representative substrate 307 and fourth representative substrate 311. The representative substrates can be used for obtaining representative spectrums and marking parameters as discussed above.

There are many known ways to store associated data elements in a data storage device. One of those ways is to store them in a relational database table, referred to herein as a marking dataset table. FIG. 4 illustrates a marking dataset table containing marking parameters and associated substrate types. A marking dataset table 401 can have a column for substrate types 402 and one for marking parameters 403. In one row the substrate type cell 404 is 1 and the marking parameter cell 405 contains color lookup tables (LUTs) for cyan, denoted LUT-C, and magenta, denoted LUT-M. In a second row substrate type 2 404 is associated with a color table for black, LUT-K 407. In a third row substrate type 1 408 is associated with a color table for yellow, LUT-Y 409. Retrieving data associated with substrate type 2 results in processing of input color data through the black LUT. Retrieving data associated with substrate type 1 results in the processing of input color data through LUTs for cyan, magenta, and yellow.

Most relational databases can implement the marking dataset table shown. Other data structures, such as arrays can be used with slightly different results. If an array is used, the array index can also be the substrate type. However, each substrate type can have only one entry in such an array implementation while the relational database solution is more general. The important property is that two pieces of data can be associated so that reference to one allows retrieval of the other. There are many solutions with this important property.

FIG. 5 illustrates a table of representative spectrums and associated substrate types. A spectrum dataset table 501 can have two columns, a substrate type column 502 and a representative spectrum column 503. In one row the substrate type cell 504 is 1 and the representative spectrum cell 505 contains a representative spectrum. In a second row substrate type 2 is associated with the representative spectrum held in representative spectrum cell 507. In a third row substrate type 3 508 is associated with the representative spectrum held in representative spectrum cell 509. In a fourth row substrate type 1 510 is associated with the representative spectrum held in representative spectrum cell 511.

The Tables of FIG. 4 and FIG. 5 are presented as holding data in two different tables. The two tables can be combined into a single table. The data in a table can be stored in a relational database, an array, a hash table, a linked list, a tree, or using one of the many other data storage techniques known to those practiced in the arts of programming, data structures, databases, or data storage.

Figure 6:
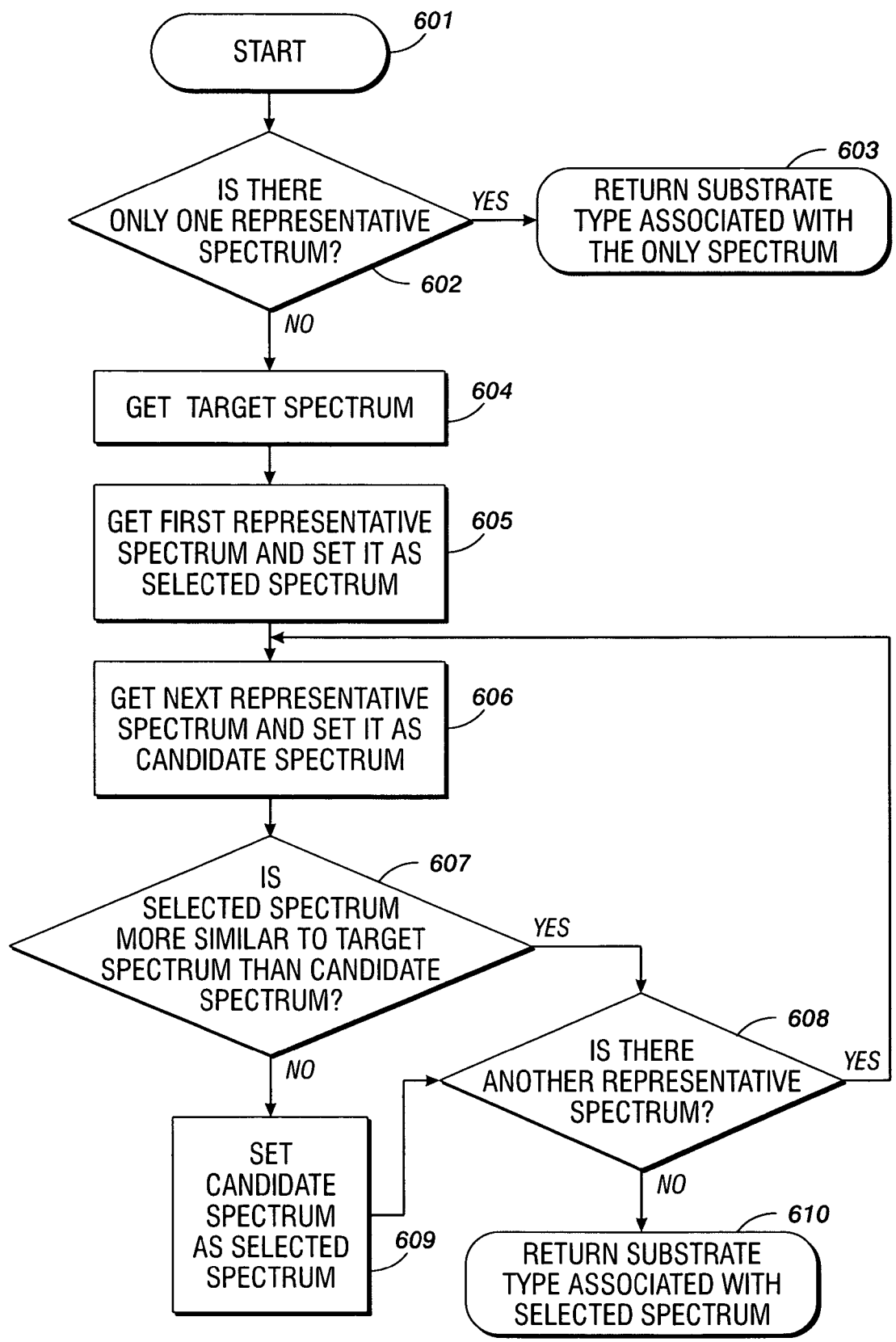
FIG. 6 illustrates a high level flow diagram for identifying the substrate type of a target substrate.

FIG. 6 illustrates a high level flow diagram for determining the substrate type of a target substrate. The process flow illustrated can be used by the system shown in FIG. 1. It can also make use of the table shown in FIG. 5. After the start 601, the process checks to see if more than one substrate type is known 602. If the table of FIG. 5 is used, then the number of known substrate types can be found by examining the substrate type column 502. If only one substrate type is known, the process illustrated decides that must be the substrate type of the target substrate 603.

If there is more than one substrate type known, then the target spectrum is obtained 604. A first representative spectrum is obtained and set as the selected spectrum 605. If the table of FIG. 5 is used, then the first representative spectrum can be obtained by retrieving the contents of cell 505 from a storage device. The selected spectrum is the representative spectrum that is currently the most similar to the target spectrum. Next, another representative spectrum is obtained and set as the candidate spectrum 606. For example, the contents of cell 507 can be retrieved and set as the candidate spectrum. A decision is made as to whether the target spectrum is more similar to the candidate spectrum or the selected spectrum 607. If it is more similar to the candidate spectrum, then the candidate spectrum becomes the new selected spectrum 609. The decision on spectrum similarity 607 can be based on mathematical comparisons such as the distance and correlation measures discussed above. Greater similarity is indicated by smaller distance measures and larger correlation measures.

If there are any representative spectrums that haven't been tested as candidate spectrums 608, then the process repeats by obtaining the next representative spectrum and setting it as the candidate spectrum 606. Otherwise, the process is done and the selected spectrum is the representative spectrum that was found to be most similar to the target spectrum. The substrate type associated with the selected spectrum can be returned to be treated as the substrate type of the target spectrum 610. For example, if the table of FIG. 5 is used and the representative spectrum of cell 509 is the selected spectrum because it is found to be most similar to the target spectrum, then the substrate type in cell 508, substrate type 3, is returned.

Since a reflectance spectrum for the target substrate is needed to determine the substrate type, this must be obtained somehow. A spectrophotometer can be positioned to get the target spectrum for target substrates in a marking engine's input port. Target spectrums can be taken from every target substrate before it is moved into the marking engine. In this case the marking engine can be adjusted for every target substrate. This option can be more beneficial when the input port accepts stacked sheets because the stack can contain sheets of different substrate type. A different option is to take a target spectrum only when new material is loaded into the input port. This option assumes that only one substrate type is loaded into the input port. This option can be more beneficial when large rolls of paper are loaded into the input port.

A spectrophotometer can also be positioned to obtain target spectrums from target substrates located in a marking engine's output port. This position can be advantageous if the spectrophotometer is also used for other purposes, such as the testing involved in producing color tables as discussed above. One way to get the target spectrum is to measure an un-patterned part of a target substrate that has passed through the marking engine. This option assumes that the next target substrate will be of the same substrate type. Another option is to move a target substrate through the marking engine without patterning it and then measuring the target spectrum. This option is more beneficial when a stack of material is placed in the input port. At the time the new material is loaded, an un-patterned target substrate is moved through the marking engine so that the substrate type can be determined. If the target substrate is in the form of a roll, then a portion of the roll can be passed un-patterned through the marking engine.

Alternatively, if the measurement spectrophotometer is located at the end of the physical marking process, i.e. near the marking engine output port, a patterned part of the paper can be measured. Since the spectral characteristics of the colorant are known and the spectral substrate characteristics can be derived from an un-patterned part of the substrate, a toner layer thickness estimate can be obtained. This thickness is a direct correlate to substrate surface characteristics and thus can be used to more correctly identify the substrate from the list. For this, the stored data for each substrate would also contain spectral data for certain selected patterns on the substrate.

Embodiments can be implemented in the context of modules. In the computer programming arts, a module can be typically implemented as a collection of routines and data structures that performs particular tasks or implements a particular abstract data type. Modules generally can be composed of two parts. First, a software module may list the constants, data types, variable, routines and the like that that can be accessed by other modules or routines. Second, a software module can be configured as an implementation, which can be private (i.e., accessible perhaps only to the module), and that contains the source code that actually implements the routines or subroutines upon which the module is based. Thus, for example, the term module, as utilized herein generally refers to software modules or implementations thereof. Such modules can be utilized separately or together to form a program product that can be implemented through signal-bearing media, including transmission media and recordable media.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of adapting a marking engine comprising:
    measuring light reflected from an unpatterned target substrate to thereby obtain a target spectrum comprising measurements of the reflectivity of the target substrate at a plurality of different wavelengths;
    retrieving substrate classification data for a plurality of substrate types from a first storage device wherein the substrate classification data comprises a plurality of representative spectrums wherein each representative spectrum comprises representations of the reflectivity of a known substrate at a plurality of different wavelengths;
    determining a substrate type for the target substrate by comparing the target spectrum to each of the representative spectrums;
    retrieving from a second storage device a predetermined color table that is associated with the substrate type; and
    printing onto target media of the same substrate type as the target substrate wherein the printing is adjusted in conformance with the predetermined color table.

2. The method of claim 1 further comprising obtaining the target spectrum while the target substrate is located in a marking engine input port.

3. The method of claim 1 further comprising obtaining the target spectrum while the target substrate is located in a marking engine input port at the time that a plurality of target substrates are loaded into the marking engine input port.

4. The method of claim 1 further comprising obtaining the target spectrum while the target substrate is located in a marking engine output port.

5. The method of claim 1 further comprising transferring the target substrate from a marking engine input port to a marking engine output port without patterning the target substrate and obtaining the target spectrum while the target substrate is located in said marking engine output port.

6. The method of claim 1 further comprising:
    selecting a specific representative spectrum from the representative spectrums that is most similar to the target spectrum; and
    determining the substrate type of the target to be the same as that associated with the specific representative spectrum.

7. The method of claim 6 further comprising producing a Euclidean distance between each of the representative spectrums and the target spectrum and using the Euclidean distance to select the specific representative spectrum.

8. The method of claim 6 further comprising producing a Mahalinobis distance between each of the at least one representative spectrums and the target spectrum and using the Mahalinobis distance to select the specific representative spectrum.

9. The method of claim 6 further comprising producing a correlation measure between each of the at least one representative spectrums and the target spectrum and using the correlation measure distance to select the specific representative spectrum.

10. The method of claim 1 further comprising accepting at least one user specified marking parameter wherein there is a conflict between the at least one user specified marking parameter and the at least one marking parameter and generating an error of the conflict.

11. The method of claim 1 wherein the printing is adjusted by utilizing the predetermined color table to adjust a marking engine, thereby adapting the marking engine for patterning the target substrate.

12. The method of claim 1 wherein the printing is adjusted by altering a print job before submission to a marking engine.

13. The method of claim 1 wherein a relational database stores the classification data and maintains associations between the substrate types and the representative spectrums.

14. The method of claim 1 wherein a relational database stores a plurality of predetermined color tables comprising the predetermined color table and maintains associations between the substrate types and the predetermined color tables.

15. The method of claim 1 wherein an array data structure stores the classification data and maintains associations between the substrate types and the representative spectrums.

16. The method of claim 1 wherein an array data structure stores a plurality of predetermined color tables comprising the predetermined color table and maintains associations between the substrate types and the predetermined color tables.

17. A method comprising:
choosing a plurality of substrate types;
associating a plurality of representative spectrums with the substrate types wherein each of the representative spectrums comprises representations of the reflectivity of a known substrate at a plurality of different wavelengths;
storing in a storage device a spectrum dataset comprising the representative spectrums associated with the substrate types;
associating a plurality of color tables with the substrate types; and
storing in the storage device a marking dataset comprising the color tables associated with the substrate types, thereby creating a library of color tables that are associated with substrate types.

18. A system comprising:
a storage device adapted to store a marking dataset and a spectrum dataset wherein the marking dataset comprises a plurality of color tables associated with a plurality of substrate types wherein the spectrum dataset comprises a plurality of representative spectrums associated with the substrate types and wherein each representative spectrum comprises representations of the reflectivity of a known substrate at a plurality of different wavelengths;
a spectrum measuring device to measure a target spectrum from a target substrate wherein the target spectrum comprises measurements of the reflectivity of the target substrate at a plurality of different wavelengths;
a processor to compare the target spectrum to the representative spectrums and thereby determine a target substrate type and to retrieve from the storage device the color table associated with the target substrate type;
an adjustable marking engine that accepts at least one adjustment wherein the at least one adjustment is based on the color table associated with the target substrate type, thereby adapting the marking engine for patterning the target substrate.

19. The system of claim 18 further comprising an output port on the marking engine wherein the output port holds the target substrate in position for measurement by the spectrum measuring device.

* * * * *